(12) United States Patent
Hutzel

(10) Patent No.: US 6,811,288 B2
(45) Date of Patent: Nov. 2, 2004

(54) SIDEVIEW MIRROR ASSEMBLY WITH UTILITY FEATURES

(75) Inventor: Barry W. Hutzel, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 10/184,830

(22) Filed: Jun. 28, 2002

(65) Prior Publication Data

US 2003/0031023 A1 Feb. 13, 2003

Related U.S. Application Data

(60) Provisional application No. 60/302,249, filed on Jun. 29, 2001.

(51) Int. Cl.[7] .............................. B60R 1/12; F21L 4/08; G02B 7/198

(52) U.S. Cl. ...................... 362/494; 362/142; 362/183; 362/190; 362/486; 359/864; 359/865

(58) Field of Search ......................... 362/135, 142–144, 362/190, 191, 208, 486, 494, 183; 359/864, 865

(56) References Cited

U.S. PATENT DOCUMENTS

| | | |
|---|---|---|
| 1,096,452 A | 5/1914 | Perrin |
| 1,278,741 A | 9/1918 | Phelps |
| 1,353,253 A | 9/1920 | Livingston et al. |
| 1,415,465 A | 9/1922 | Nigh |
| 1,563,258 A | 11/1925 | Cunningham |
| 2,273,570 A | 2/1942 | Greenlees |
| 2,295,176 A | 9/1942 | Kelly .......................... 362/83.1 |
| 2,457,348 A | 12/1948 | Chambers |
| 2,511,971 A | 6/1950 | Dalton ....................... 362/83.1 |
| 3,596,079 A | 7/1971 | Clark |
| 4,274,078 A | 6/1981 | Isobe et al. ................... 340/98 |
| 4,475,100 A | 10/1984 | Duh |
| 4,583,155 A * | 4/1986 | Hart ............................ 362/494 |
| 4,678,294 A * | 7/1987 | Van Nostrand ............. 359/864 |
| 4,809,137 A | 2/1989 | Yamada |
| 4,890,907 A * | 1/1990 | Vu et al. ..................... 362/494 |
| 4,907,871 A | 3/1990 | Hou ............................ 350/639 |
| 4,916,430 A | 4/1990 | Vu et al. |
| 4,998,812 A | 3/1991 | Hou ............................ 350/604 |
| 5,017,903 A | 5/1991 | Krippelz, Sr. |
| 5,059,015 A | 10/1991 | Tran ............................ 359/844 |
| 5,115,352 A * | 5/1992 | do Espirito Santo ........ 359/864 |
| 5,151,824 A | 9/1992 | O'Farrell |
| 5,371,659 A | 12/1994 | Pastrick et al. |
| 5,497,305 A | 3/1996 | Pastrick et al. |
| 5,497,306 A | 3/1996 | Pastrick |
| 5,499,169 A | 3/1996 | Chen .......................... 362/83.1 |
| 5,624,176 A | 4/1997 | O'Farrell et al. ........... 362/83.1 |
| 5,634,234 A * | 6/1997 | Allain ......................... 359/864 |
| 5,644,443 A * | 7/1997 | Hung .......................... 359/865 |
| 5,669,699 A | 9/1997 | Pastrick et al. ............. 362/83.1 |
| 5,669,704 A | 9/1997 | Pastrick ...................... 362/83.1 |
| 5,669,705 A | 9/1997 | Pastrick ...................... 362/83.1 |
| 5,687,035 A * | 11/1997 | Lang ........................... 359/864 |
| 5,721,646 A * | 2/1998 | Catlin et al. ................. 359/865 |
| 5,823,654 A | 10/1998 | Pastrick et al. ............. 362/83.1 |
| 5,863,116 A | 1/1999 | Pastrick et al. ............. 362/494 |
| 5,871,275 A | 2/1999 | O'Farrell et al. ........... 362/494 |
| 5,879,074 A | 3/1999 | Pastrick |
| 5,886,838 A | 3/1999 | Kuramoto ................... 359/841 |
| 5,892,438 A * | 4/1999 | Vaughn ....................... 362/494 |
| 6,024,459 A * | 2/2000 | Lewis ......................... 359/864 |
| 6,079,858 A * | 6/2000 | Hicks .......................... 362/486 |

(List continued on next page.)

Primary Examiner—Alan Cariaso
(74) Attorney, Agent, or Firm—Van Dyke, Gardner, Linn & Burkhart, LLP

(57) ABSTRACT

An exterior sideview mirror assembly for a vehicle includes a housing or casing and a reflective element, which is supported in the casing. The casing includes a storage space, which provides storage for at least one accessory. The accessory is retrievable from the storage space and useable exteriorly of the mirror assembly.

40 Claims, 8 Drawing Sheets

U.S. PATENT DOCUMENTS

| | | |
|---|---|---|
| 6,086,229 A | 7/2000 | Pastrick et al. |
| 6,149,287 A | 11/2000 | Pastrick et al. ............. 362/494 |
| 6,176,602 B1 | 1/2001 | Pastrick et al. ............. 362/494 |
| 6,250,783 B1 * | 6/2001 | Stidham et al. ............. 362/494 |
| 6,276,821 B1 | 8/2001 | Pastrick et al. ............. 362/494 |
| 6,280,069 B1 | 8/2001 | Pastrick et al. ............. 362/494 |
| 6,398,375 B1 * | 6/2002 | Englander ................... 359/864 |

* cited by examiner

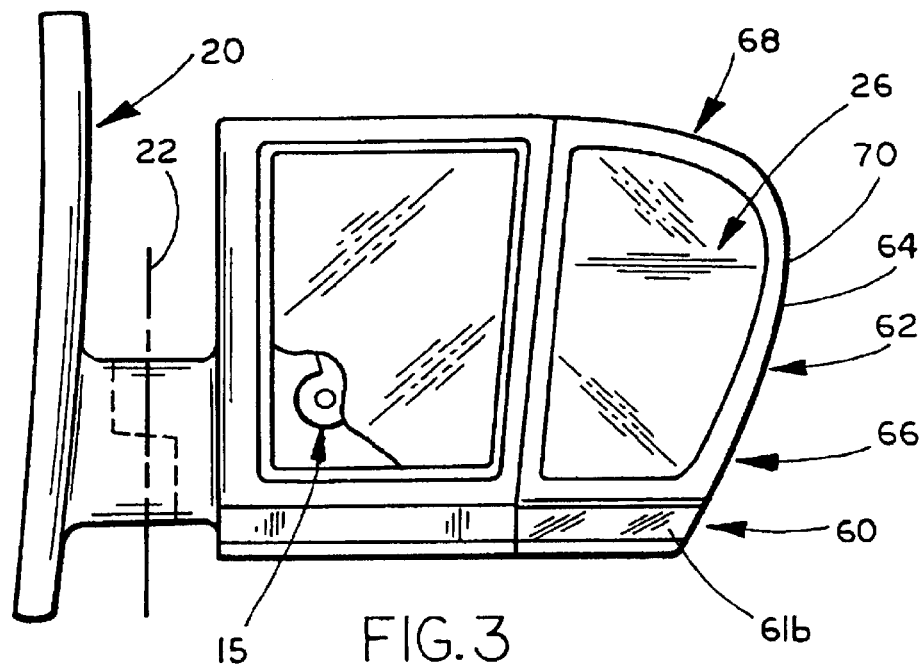
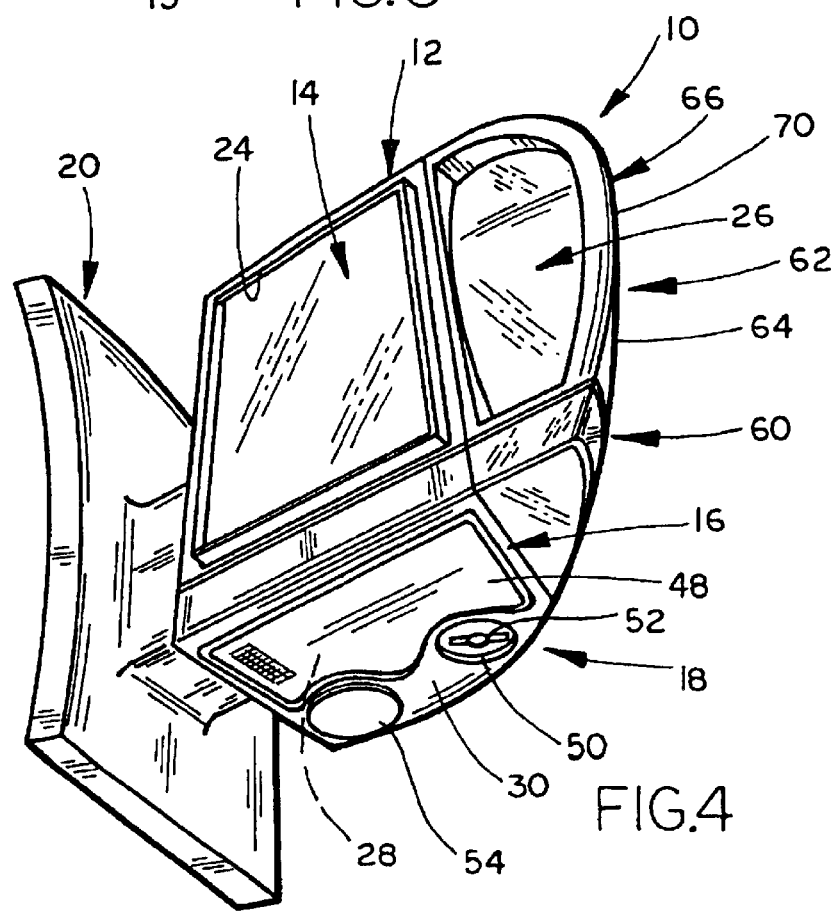

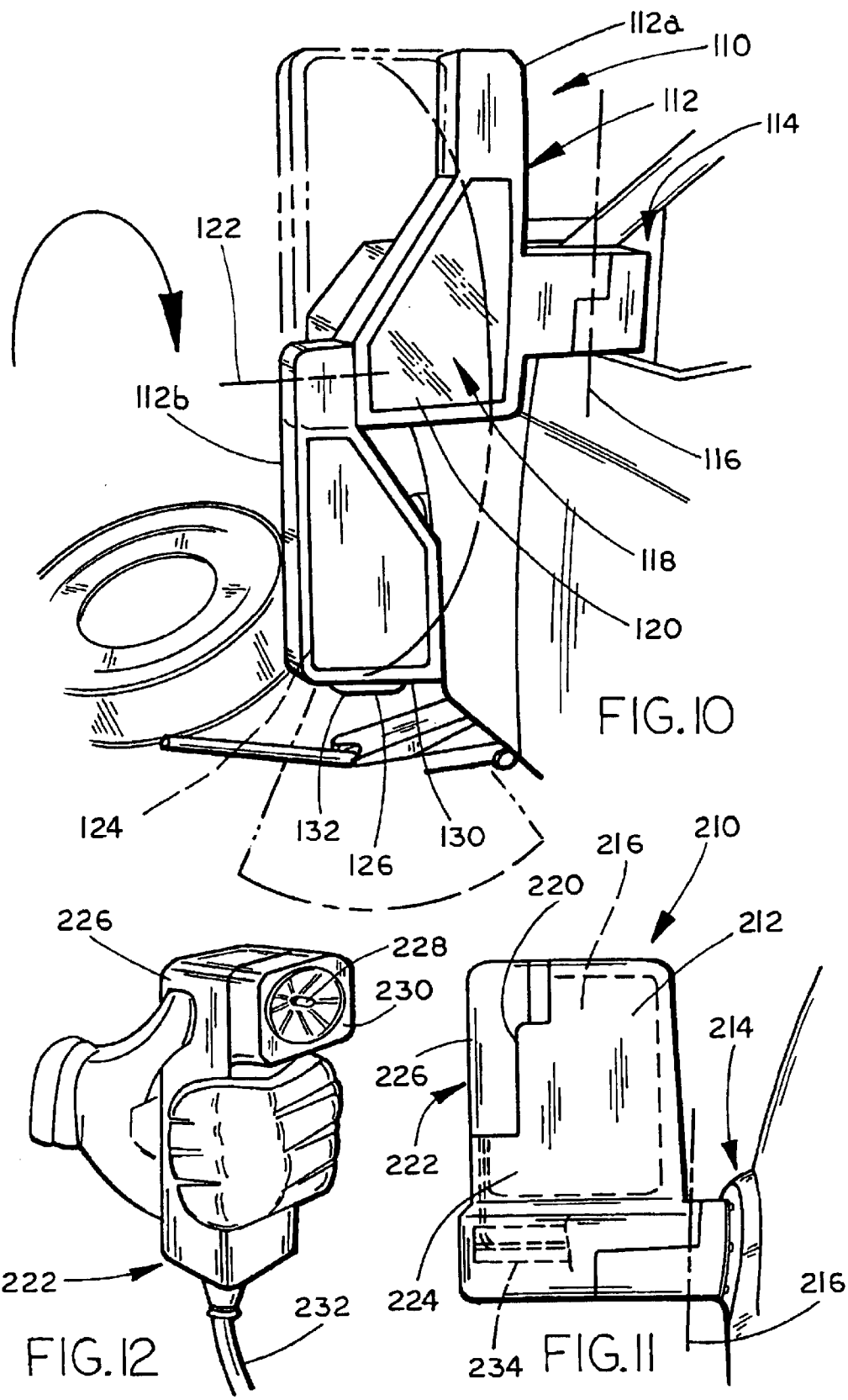

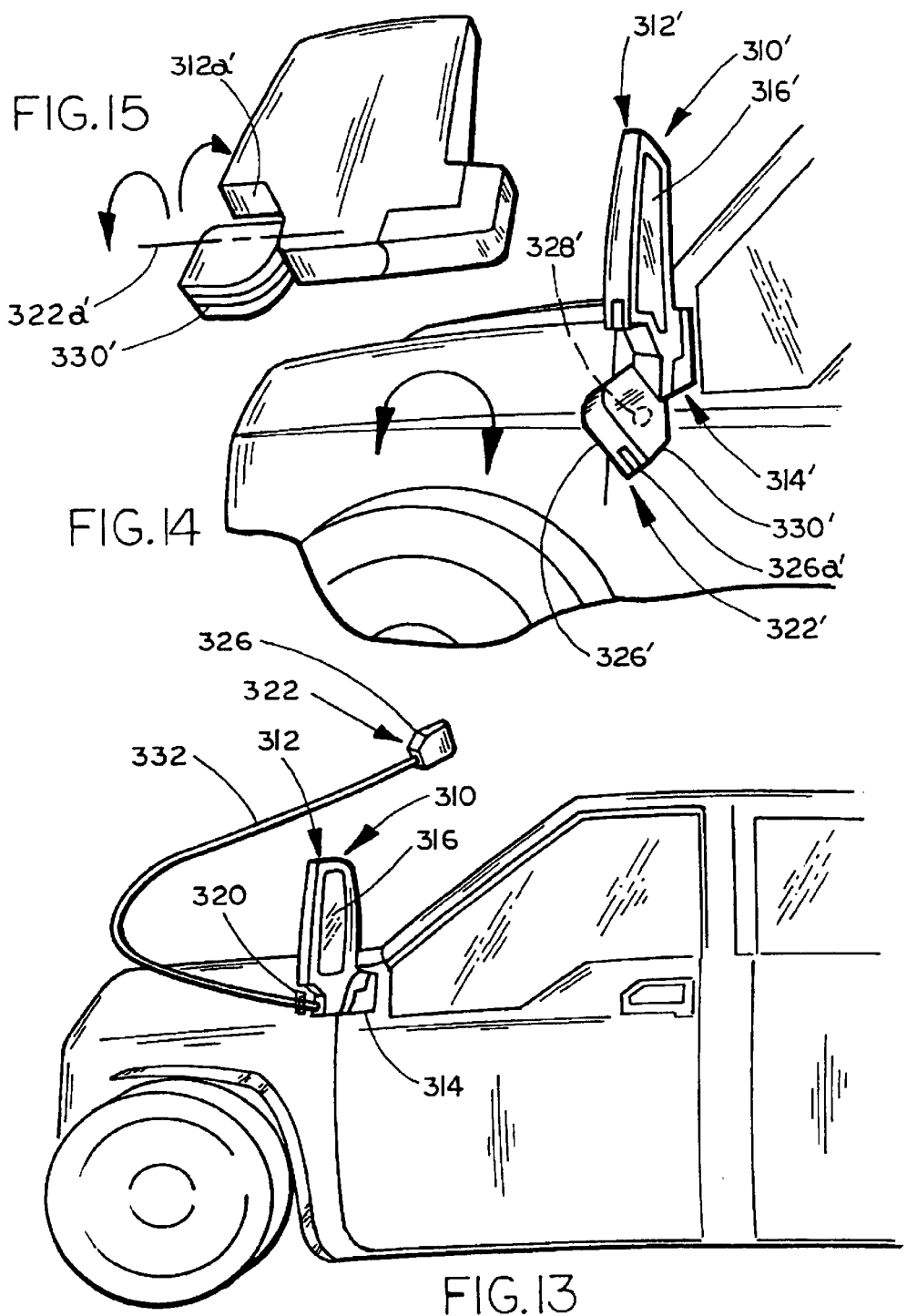

SIDEVIEW MIRROR ASSEMBLY WITH UTILITY FEATURES

This application claims priority from U.S. Provisional Application Ser. No. 60/302,249, filed Jun. 29, 2001, entitled SIDEVIEW MIRROR ASSEMBLY WITH UTILITY FUNCTIONS, by Applicant Barry W. Hutzel, and is incorporated by reference herein in its entirety.

TECHNICAL FIELD AND BACKGROUND OF THE INVENTION

The present invention relates to a sideview mirror assembly and, more specifically, to an exterior sideview mirror assembly for use in vehicles which incorporates utility functions, such as storage space for holding or housing various accessories.

Historically, exterior mirror assemblies have been used primarily for rear or side vision. However, more recently, exterior mirror assemblies have incorporated signal or security light assemblies (such as described in U.S. Pat. Nos. 5,371,659; 5,497,305; 5,669,705; 5,863,116; 6,074,777; 6,099,155; 5,497,306; 5,669,699; 5,669,704; 5,879,074; 5,823,654; 6,086,229; 6,149,287; and U.S. patent application Ser. No. 09/596,015, now U.S. Pat. No. 6,296,379; Ser. No. 09/641,371, U.S. Pat. No. 6,299,333; Ser. No. 09/335,010, U.S. Pat. No. 6,276,821; and Ser. No. 09/630,332, now U.S. Pat. No. 6,280,069, all of which are incorporated by reference in their entireties herein, all commonly assigned to Donnelly corporation of Holland, Mich.), which improve communication between drivers and enhance security of the vehicle on which the mirror assembly is mounted.

In addition, exterior mirror assemblies have incorporated various other components, such as antennas, including cellular phone antennas, global positioning system (GPS) antennas, such as disclosed in U.S. Pat. No. 5,971,552, a communication module, such as disclosed in U.S. Pat. No. 5,798,688, blind spot detection systems, such as disclosed in U.S. Pat. Nos. 5,929,786 or 5,786,772, transmitters and/or receivers, such as garage door openers, including a HOMELINK® system, a digital network, such as described in U.S. Pat. No. 5,798,575, a high/low head lamp controller, such as disclosed in U.S. Pat. No. 5,715,093, a tire pressure display or monitoring system, such as disclosed in U.S. patent application entitled TIRE INFLATION ASSISTANCE MONITORING SYSTEM, Ser. No. 09/513,941, filed Feb. 28, 2000, now U.S. Pat. No. 6,294,989, and TIRE INFLATION ASSISTANCE MONITORING SYSTEM, filed Nov. 10, 2000, now U.S. Pat. No. 6,445,287, with all of the referenced patents and applications commonly assigned to Donnelly Corporation, the disclosures of which are herein incorporated by reference in their entireties.

With these additional features and devices, drivers have become accustomed to engage in more and more activities in and around their vehicles—especially non-driving activities. At the same time, vehicle manufacturers have also increased the number of driving related accessories, such as: Navigation aids, including on board computers with GPS maps, ONSTAR systems; safety systems, such as airbags; and vision systems, such as rear-vision systems, including reverse aid systems and internal cabin surveillance systems, or the like.

With this increase in activities and accessories, storage space in the vehicle has become more coveted and is quickly diminishing. In addition, many accessories that are used inside and outside the vehicle require a power supply. Unless the accessory is hardwired into the vehicle electrical system, the accessory must be plugged into a power plug, such as a cigarette lighter plug. In most vehicles, a single interior power plug is provided—though an increasing number of vehicles offer two power supply plugs to meet the ever-increasing demand for power in the vehicle. As described in U.S. patent application entitled REARVIEW MIRROR ASSEMBLY WITH UTILITY FUNCTIONS, Ser. No. 09/449,121, filed Nov. 24, 1999, now U.S. Pat. No. 6,428,172, which is incorporated by reference in its entirety herein, the functions and role of interior mirror assembly has expanded to meet the ever-increasing activities inside the vehicle, by including for example storage space and additional power source plugs. For those activities outside the vehicle, the interior rearview mirror assembly and the dashboard (where most power plugs are normally located) are not as convenient and the accessory must have a sufficient cord length to pass though either an open window or open door to reach most conventional power supply plugs.

Consequently, there is a need to maximize storage space in vehicles for storing and locating objects and accessories and optimize the location of accessories, such as power supply plugs, while providing accessories in a location that is easily accessible from the exterior of the vehicle. In addition, it is desirable that the space which is used to store or locate these objects and accessories does not detract from the vehicle's appearance or interfere with the driver's view.

SUMMARY OF THE INVENTION

The present invention provides an exterior sideview mirror assembly, which includes a mount for attachment of the assembly to a vehicle and one or more storage spaces for storing, locating or holding objects and/or accessories.

In one form of the invention, an exterior sideview mirror assembly includes a casing or housing, with a reflective element and a storage space. The storage space provides storage for at least one accessory and for storing the accessory in a location, which is easily accessible exteriorly of the vehicle.

In one aspect, the storage space is defined by a recess provided on or in the casing, for example a recess provided in a lower wall of the casing. In further aspects, the storage space includes a door to close the storage space to form a compartment in which the accessory can be inserted and enclosed to minimize the conspicuity of the accessory.

In another embodiment, the walls of the storage space are defined by the wall of the mirror assembly casing itself and are formed, such as by molding.

In other forms, the casing includes a recess, which extends into a bottom wall of the casing.

According to another form of the invention, an exterior sideview mirror assembly includes a mirror housing, and reflective element, which is positioned in the housing. The mirror assembly further includes a light assembly, which is positionable in and adapted to be supported in a storage compartment of the mirror housing. The light assembly is removable from the compartment and is adapted to be useable when removed from the compartment.

In other aspects, the compartment is defined by a recessed portion of the mirror casing. Optionally, the mirror assembly includes a second recessed portion, which houses an accessory that is accessible exteriorly of the vehicle. For example, the accessory may comprise a power socket.

According to another aspect, the light assembly is operable independent of the mirror assembly. Optionally, the light assembly may include a pair of contact for coupling to a rechargeable battery positionable in the lighting assembly. Furthermore, the compartment may include a pair of contacts for connecting to a power source, with a pair of contacts of the compartment positioned to align with and make contact with the contacts of the light assembly for recharging the rechargeable battery contained in the light assembly when the light assembly is positioned in the compartment.

In yet another form of the invention, an exterior sideview mirror assembly includes a housing, with a reflective element, and a light assembly. The housing includes a housing wall with a recessed formed therein. The recess defines a storage space for storing the light assembly wherein the light assembly is positionable in the recess for storage and movable therefrom. In addition, the light assembly is adapted for use exteriorly of the storage space.

In one aspect, the light assembly is removable from the storage space and is used remote from the housing of the mirror assembly. For example, the light assembly may include a power source whereby the light assembly can be used independently of the housing of the mirror assembly.

In another aspect, the light assembly is coupled to the housing by a cord. For example, the cord may comprise a power cord for electrically coupling the light assembly to a vehicle base power source. In one form, the cord comprises a retractable cord.

According to yet another form of the invention, an exterior sideview mirror assembly for a vehicle includes a first mirror casing and a second mirror casing. The first mirror casing includes a first reflective element, while the second mirror casing includes a second reflective element with one of the reflective elements comprising a curved reflective element. The first mirror casing is movable about a first pivot axis, while the second mirror casing is movable about a second pivot axis whereby the second mirror casing may be rotated relative to the first mirror casing for repositioning the second reflective element relative the first reflective element.

In one aspect, the first pivot axis and the second pivot axis are co-linear.

In another aspect, the mirror assembly further includes a support which is adapted to mount the first and second mirror casings to a vehicle. For example, the first and second mirror casings may be rotatably mounted to the support and, further, with the pivot axes of the first and second mirror casings being co-linear.

According to another aspect, the mirror assembly further includes a light assembly, which is adapted to direct light from the mirror assembly. For example, the support may include the light assembly.

In another aspect, the second pivot axis comprises a generally horizontal pivot axis. Furthermore, the second mirror casing may include a light assembly which is adapted to direct light from the mirror assembly. The light assembly may be positioned at an end wall of the second mirror casing wherein the light assembly directs light generally downward when the second mirror casing is rotated to an extended position about the generally horizontal pivot axis. For example, the second mirror casing is rotatable approximately 180° about the generally horizontal pivot axis wherein the second reflective element is moved between a rearward facing orientation to a forward facing orientation when the second mirror casing is moved to its extended position and the mirror assembly is mounted to a side of a vehicle.

Advantages provided by the present invention include an exterior storage location that is easily accessible exteriorly of the vehicle. Further, the location of the storage space is inconspicuous and not readily discernible from the outside of the vehicle enhancing the security for the accessory.

These and other objects, advantages, purposes, and features of the invention will become more apparent from the study of the following description taken in conjunction with the drawings.

BRIEF DESCRIPTION OF THE DRAWINGS

FIG. 3 is a front elevation of the sideview mirror assembly of FIG. 1;

FIG. 4 is a bottom perspective view of the mirror assembly of FIG. 1 illustrating a closed accessory storage space;

FIG. 10 is a perspective view of another embodiment of a mirror assembly of the present invention;

FIG. 11 is a rearward facing elevation of another embodiment of the mirror assembly of the present invention incorporating a light assembly;

FIG. 12 is an enlarged view of the light assembly of FIG. 11;

FIG. 13 is a side perspective view of another embodiment of an exterior mirror assembly of the present invention;

FIG. 14 is a side perspective view of another embodiment of an exterior mirror assembly of the present invention;

FIG. 15 is an enlarged view of the mirror assembly of FIG. 14;

DESCRIPTION OF THE PREFERRED EMBODIMENTS

Figure 1:
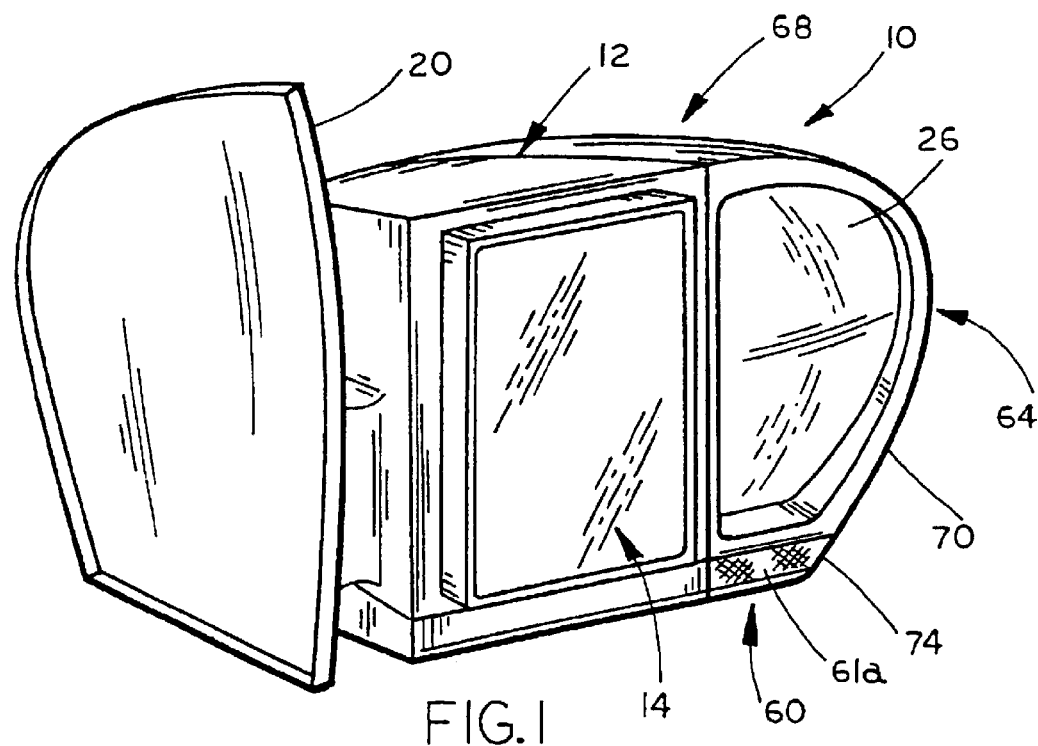
FIG. 1 is a front perspective view of the exterior sideview mirror assembly for vehicles of the present invention.

Referring to FIG. 1, the numeral 10 generally designates an exterior sideview mirror assembly of the present invention. Assembly 10 includes a movable portion and a fixed portion, which is adapted to mount to a vehicle. In the illustrated embodiment, the movable portion comprises a mirror casing or housing 12 and a reflective element assembly 14, which is supported in or on casing 12 by an actuator 15 (FIG. 3), such as a manual actuator, including a BODEN cable type actuator or an electrical actuator, that provides for repositioning of reflective element assembly 14 about one or more axes. Referring to FIGS. 4–7, mirror assembly 10 incorporates one or more storage spaces or compartments 16, 18 for storing, holding, or stowing one or more accessories in manner so that the accessories are accessible exteriorly of the vehicle. Optionally, the accessories are mounted in a manner that is inconspicuous and, further, in a manner that does not detract from the aethestic appearance of the vehicle or distract the driver, as will more fully described below. Moreover, the accessories are mounted in a manner so that they do not interfere with the slipstream of the mirror assembly so as not to increase the wind drag of the mirror assembly.

Mirror casing 12 is preferably a molded housing formed from a plastic material, and, more preferably, formed from a polypropylene or glass nylon filled material. Casing 12 may be formed from other suitable materials, such as a polyolefin, and painted or coated with a decorative finish or an in-mold film or provided with a skull cap, which may be painted or coated with a decorative finish or decorated with an in-mold film, such as described in U.S. patent applications entitled COATED EXTERIOR MIRROR HOUSING FOR VEHICLES, Ser. No. 09/348,083, filed Jul. 6, 1999, now U.S. Pat. No. 6,150,014; and COATED POLYOLEFIN EXTERIOR VEHICLE PARTS AND METHOD FOR MAKING SAME, Ser. No. 09/489,322, filed Jan. 21, 2000, which are herein incorporated by reference in their entireties. In addition, preferably, such exterior mirror components, such as mirror casings, plastic mirror mounting brackets, supports, and the like, are manufactured in molding operations that impart such components with lightweight capability but while still maintaining their structural integrity and performance. Such lightweight molding methods can include an aerated injection molding process, such as the MUCELL™ process described in U.S. patent application Ser. No. 09/679,997, filed Oct. 15, 2000, now U.S. Pat. No. 6,669,267, which is herein incorporated by reference in its entirety. Alternately, blow molding can be used during molding of, for example, a plastic mirror bracket, support, or casing or housing, so that the weight of the component is reduced thereby.

The fixed portion comprises a mirror mounting portion 20, which fixedly mounts to the side of a vehicle. Optionally, mirror casing 12 is movably mounted to mounting portion 20, for example by a break-away mechanism (which are commonly known in the art) so that casing 12 pivots or rotates about an axis 22 when an impact force having a pre-selected magnitude is applied to the casing, which minimizes damage to the casing and the various components housed in casing 12 in the event that the casing makes contact with an object. For examples of suitable break-away mechanisms, reference is made to U.S. Pat. Nos. 6,109,586; 5,903,402; and 5,949,591, and co-pending U.S. provisional application Ser. No. 60/225,128, which are incorporated by reference herein in their entireties. Alternatively or in addition, mirror assembly 10 may incorporate a power-fold mechanism, such as disclosed in U.S. Pat. Nos. 6,243,218; 5,210,651; and 5,579,178 (which are incorporated by reference herein in their entireties), which when actuated folds mirror casing 12 closer to the side of the vehicle to decrease the width of the vehicle, which is commonly used in European vehicles. In addition, mirror assembly 10 may incorporate an actuator, such as a power-fold mechanism, that moves mirror casing 12 to a folded position during operation to reduce the wind drag of the mirror assembly, such as described in co-pending application entitled VEHICLE EXTERIOR REARVIEW MIRROR ASSEMBLY, Ser. No. 60/301,219, filed Jun. 27, 2001, which is incorporated by reference herein in its entirety. It should be understood that mirror assembly 10 may comprise a fixed mirror assembly in which mirror casing 12 is rigidly mounted to or formed with mounting portion 20.

Reflective element assembly 14 may include a conventional chrome reflective element formed from a glass or plastic substrate with a chrome or other reflective layer on its first or second surface or a variable reflectance reflective element, such as an electro-optic mirror element. For examples of suitable variable reflectance mirror element, reference is made to U.S. patent application Ser. No. 09/350,930, filed Jul. 12, 1999, entitled ELECTROCHROMIC POLYMERIC SOLID FILMS, MANUFACTURING ELECTROCHROMIC DEVICES USING SUCH FILMS, AND PROCESSES FOR MAKING SUCH SOLID FILMS AND DEVICES, to Desaraju V. Varaprasad et al., now U.S. Pat. No. 6,154,306, or such as is disclosed in U.S. Pat. Nos. 5,668,663; 5,724,187; 5,910,854; and 5,239,405, the entire disclosures of which are hereby incorporated by reference herein.

Mirror casing 12 includes a rearward facing opening 24 (FIG. 4) in which reflective element assembly 14 is supported. As noted above, reflective element assembly 14 is supported in mirror casing 12 by actuator 15 (FIG. 3), which provides for remote adjustment of reflective element assembly 14 about one or more axes. For details of suitable actuators, reference is made to U.S. Pat. Nos. 5,900,999; 5,986,364; 6,094,027; 6,037,689; 6,132,052; 6,168,279; 6,213,612; and 6,243,218, which are incorporated in their entireties by reference herein. Optionally, mirror casing 12 includes a second reflective element assembly 26 which provides a wide angle view and which includes a curved reflective element (including an aspheric or multi-radius reflective element) that provides increased field of view for mirror assembly 10. For examples of suitable curved reflective elements, reference is made to U.S. patent application Ser. No. 09/478,315, entitled EXTERIOR MIRROR PLANO-AUXILIARY REFLECTIVE ELEMENT ASSEMBLY, filed Jan. 6, 2000, now U.S. Pat. No. 6,522,451, which is incorporated by reference herein in its entirety. In addition, reflective element assembly 26 may be supported by an actuator such that each reflective element assembly may be adjusted and, further, adjusted independently of each other.

Referring to FIG. 4, casing 12 includes a cavity or recess 28, which is formed in bottom wall 30 of casing 12. Mounted in recess 28 is an accessory 32 (FIG. 7), which is accessible for use exteriorly of the vehicle. Recess 28 is preferably sized to allow a persons hand to reach into recess 28 to grab accessory 32; for example, recess 28 is sized to provide a gap 28a (FIG. 6) on at least one side of accessory 32 so that a person's fingers can grasp the accessory to remove the accessory. In the illustrated embodiment, accessory 32 comprises a flashlight assembly 34 (FIG. 7), which is optionally operable independent of mirror assembly 10. Flashlight assembly 34 is positionable in recess 28 and may be held herein by a friction fit, such as between two flexible members, or by a positive clamping or coupling force, such as by a bayonet type finger, or by a magnetic force. For example, light assembly 34 may be fitted with one or more magnets, which form a magnetic chuck with a corresponding magnet or a metal member, positioned in recess 28.

Figure 7:
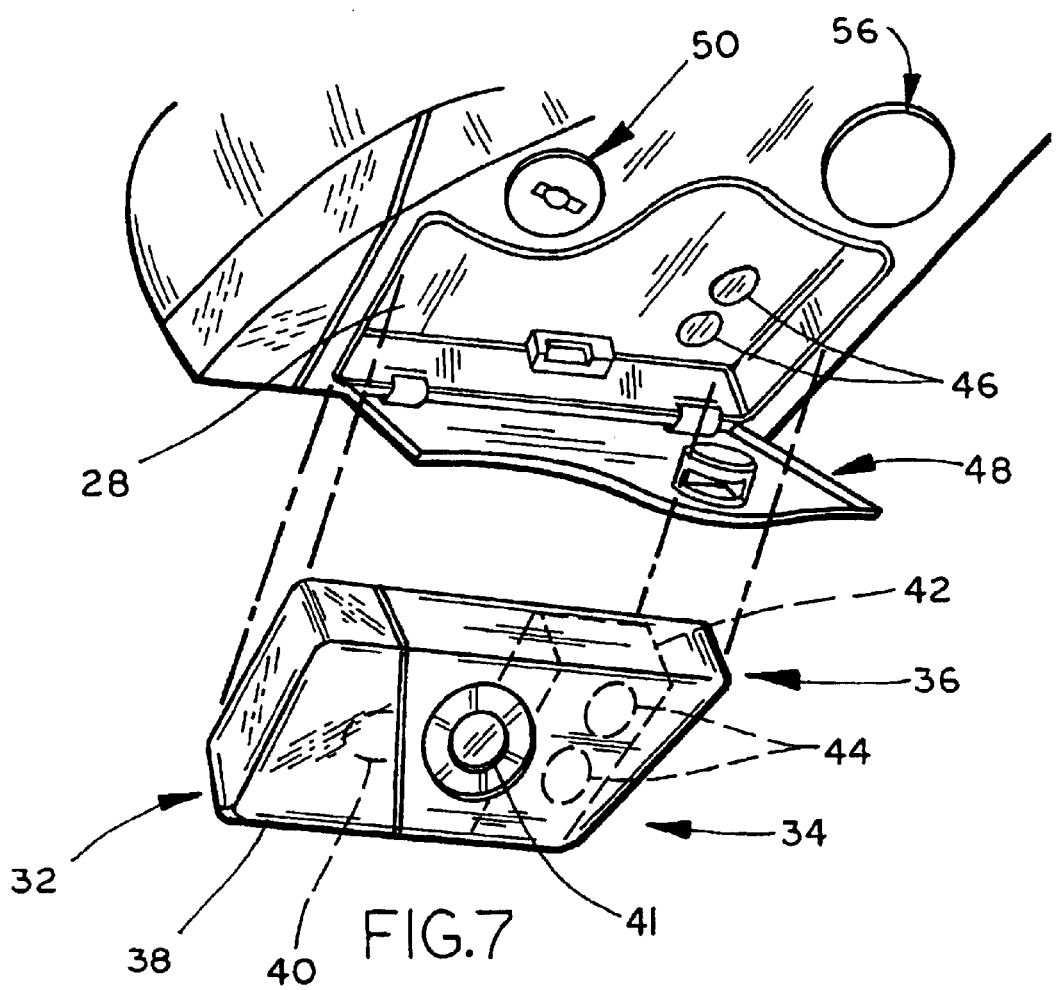
FIG. 7 is a partial bottom exploded perspective view of the mirror assembly illustrating the accessory removed from the storage space.
Figure 8:
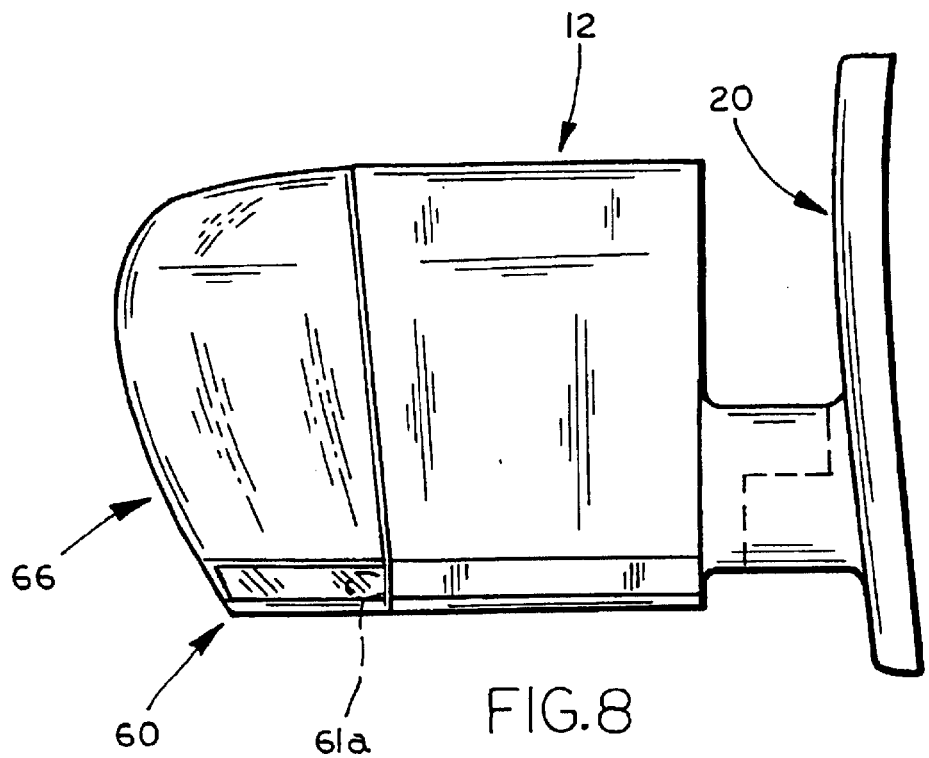
FIG. 8 is a rearward facing elevation of the mirror assembly of FIG. 1.

As best seen in FIG. 7, flash light assembly 34 includes a housing 36, a cover 38, and one or more light sources 40. Light source(s) 40 may comprise an incandescent light source, a fluorescent light source, such as a cold cathode fluorescent light source, a phosphorescent light source, a neon light source, a discharge light source, an arc light source, an electroluminescent light source (including inorganic or organic electroluminescent light sources), a laser diode light source, a solid state emitter light source (such as a light emitting diode (LED)), a light pipe source, or the like. In addition, where the light source comprises a non-incandescent light source, such as a light emitting diode, the light source may comprise a high-current LED and/or be provided as a unit, such as described in co-pending provisional application entitled VEHICULAR NON-INCANDESCENT LIGHT SOURCE UNIT, Ser. No. 60/271,466, filed Feb. 26, 2001, by John O. Lindahl and Niall R. Lynam, which is incorporated by reference in its entirety. Depending on the directionality of light source(s) 40, cover 38 may comprise a transparent lens or a transparent lens with one or more light directing features, for example optical structures, for directing light from light source 40 in a desired light pattern.

Light source 40 is powered by a voltage storage device, such as a battery 42, which is also housed in housing 36 and actuated by a switch or button 41 provided on housing 36. Battery 42 may comprise a rechargeable battery, which is recharged through contacts 44 provided on the housing. Optionally positioned in recess 28 are a pair of contacts 46, which are connected to a power supply, such as the vehicle ignition voltage. Contacts 46 are positioned in recess 28 such that they align and make contact with contacts 44 of light assembly 34 when light assembly 34 is positioned in recess 28 so that the battery can be recharged when light assembly 34 is in its stowed position. As noted in the above referenced patent, the voltage storage device may alternately comprise a capacitor.

When positioned in recess 28, light assembly 34 is fully recessed in the storage space so that it does not protrude from mirror casing 12. In addition, storage space 28 is optionally closed by a door or cover 48, which preferably generally follows the contour of casing 12 and is preferably substantially flush with a lower outer surface 30a of lower wall 30 of casing 12. In this manner, when light assembly 34 is returned to its stowed position and door 48 is closed, both accessory 32 and door 48 are inconspicuous and not readily visible to a casual observer. Door 48 is mounted to casing 12, for example by one or more hinges so that door 48 can be opened while still being attached to casing 12. In the illustrated embodiment, casing 12 includes a lock 50, which selectively locks door 48 in its closed position. For example, lock 50 includes a keyed opening 52 so that a key is needed to open and lock door 48.

In addition to providing a storage space for light assembly 34, as previously noted, casing 12 includes a second storage space 18. Storage space 18 is adapted to hold a power socket 54 therein to provide a power supply, which is accessible exteriorly of the vehicle. In the illustrated embodiment, power socket 54 is also located in bottom wall 30 of casing 12 adjacent storage space 16. Storage space 18 is formed by cylindrical recess 60, which extends upwardly from bottom wall 30 behind recess 28. Optionally, power socket 54 includes a cover, such as a plastic or rubber cover 56 that snaps onto or presses into the opening 58 of cylindrical recess 60 so that it provides a weather seal for power socket 54. Although illustrated as projecting downwardly from bottom wall 30, cover 56 may be flush mounted to thereby minimize, if not eliminate, any impact on the air flow across mirror assembly 10.

Alternately, storage spaces 16 and 18 may be formed in a separate modular housing that attaches to the bottom wall of casing 12—in this manner, the accessory storage space may be post-attached, for example, at a dealership.

Figure 2:
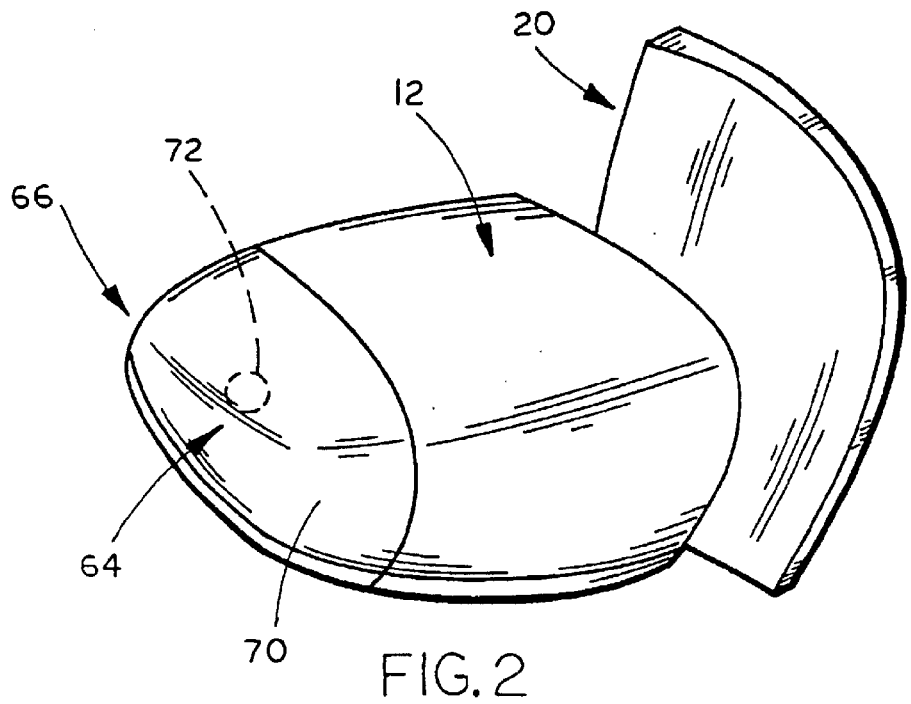
FIG. 2 is a rearward facing perspective view of the mirror assembly of FIG. 1.
Figure 5:
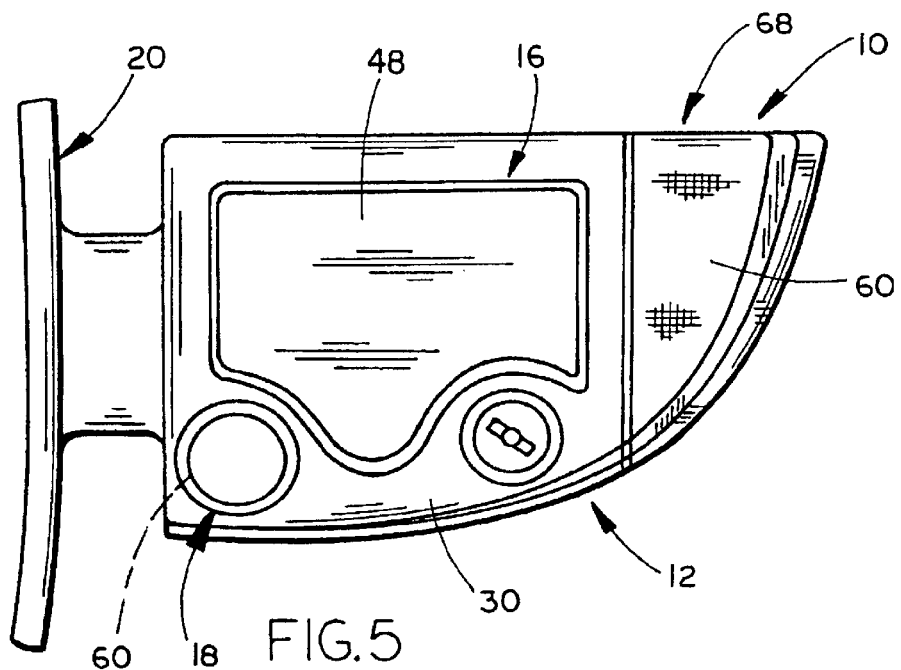
FIG. 5 is an enlarged bottom plan view of the mirror assembly of FIG. 4.
Figure 6:
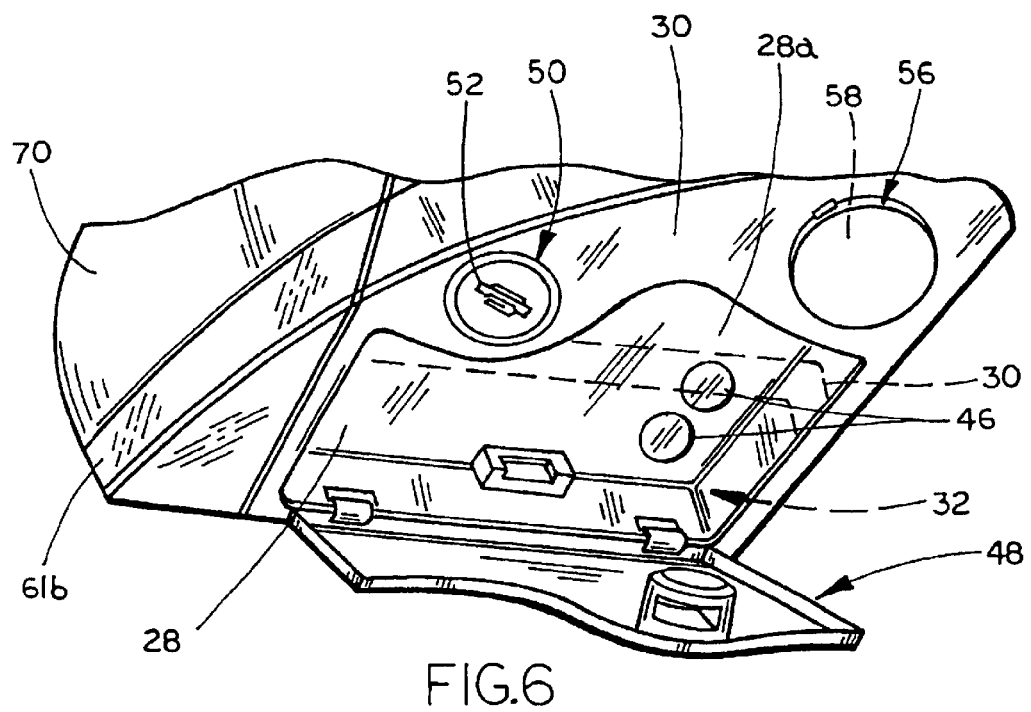
FIG. 6 is an enlarged bottom perspective view of the mirror assembly of FIG. 5 illustrating the storage space opened.
Figure 9:
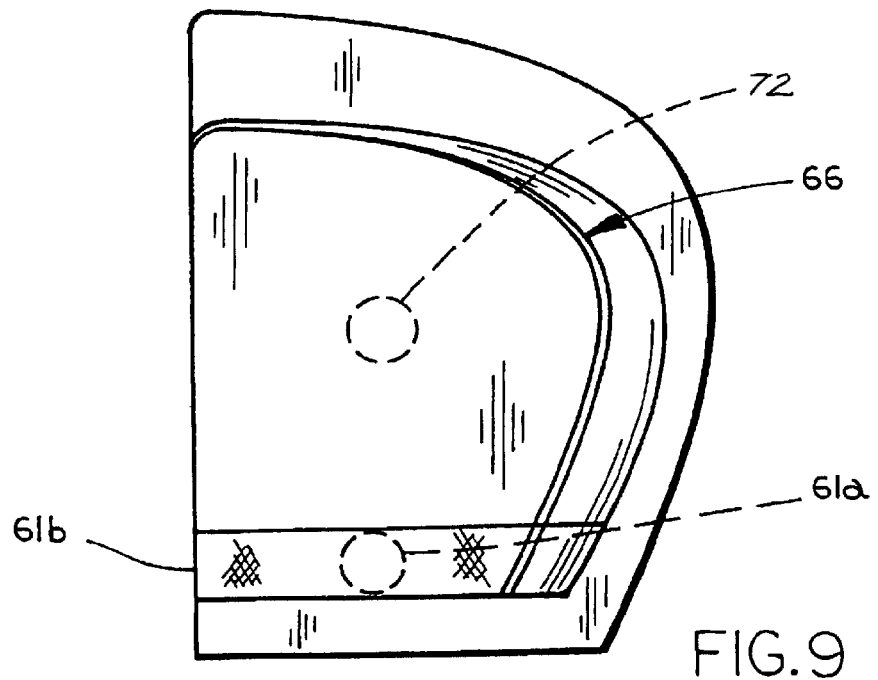
FIG. 9 is an elevation of the outboard end of the mirror assembly of FIG. 8.

Referring to FIGS. 2 and 3, mirror assembly 10 further includes a fixed light assembly 60. Light assembly 60 includes a light source 61a and a cover or lens 61b (FIG. 9), which forms a part of or is attached to mirror casing 12, as will be more fully described below. Light source 61a may similarly comprise an incandescent light source, a fluorescent light source, such as a cold cathode fluorescent light source, a phosphorescent light source, a neon light source, a discharge light source, an arc light source, an electroluminescent light source (including inorganic or organic electroluminescent light sources), a laser diode light source, a solid state emitter light source (such as a light emitting diode (LED)), a light pipe source, or the like. Furthermore, light source 61a may comprise a light source or light source unit such as described in provisional application entitled VEHICULAR NON-INCANDESCENT LIGHT SOURCE UNIT, Ser. No. 60/271,466, filed Feb. 26, 2001, by John O. Lindahl and Niall R. Lynam, which is incorporated by reference in its entirety. Light assembly 60 is suitable for use as a security light and may be used, for example, to illuminate the ground adjacent the door or doors of the vehicle to create a lighted security zone adjacent the vehicle. In addition, light assembly 60 may be used to wash the side of the vehicle door with light, which is particularly useful when a driver approaches the vehicle at night and wishes to see the keyhole or the handle of the door. Alternately, light assembly 60 may comprise a signal light. In which case, either lens 61b or light source(s) 61a would be adapted to project light laterally outward and rearward of the vehicle so that the light emitted by light assembly 60 would be visible to a driver adjacent or approaching the vehicle equipped with mirror assembly 10.

As best understood from FIGS. 1, 3, and 4, light assembly 60 may be provided as part of a module 62, which comprises second reflective element assembly 26, a housing 64, a signal light assembly 66, and light assembly 60. Module 62 is mounted to or formed with, such as by co-injection molding, casing 12 to form outboard end 68 of mirror assembly 10. Signal light assembly 66 includes a lens or cover 70, which forms an upper portion of housing 64. Lower portion of housing 64 forms lens or cover 61b of light assembly 60. For example, cover 70 may be formed, such as by molding from a plastic. Cover 70 optionally incorporates light directing features, such as optical surfaces, to direct light from light source or light sources 72 of signal light assembly 66 outwardly and forwardly so that the signal light assembly 66 forms a supplemental turn signal that can be seen by oncoming vehicles, as well as vehicles adjacent to the vehicle equipped with mirror assembly 10. Light sources 72 are positioned behind reflective element assembly 26 (as viewed in FIGS. 1, 3, and 4) or, in other words, forwardly of reflective element assembly 26 (relative to the vehicle). Light sources 72 may similarly comprise an incandescent light source, a fluorescent light source, such as a cold cathode fluorescent light source, a phosphorescent light source, a neon light source, a discharge light source, an arc light source, an electroluminescent light source (including inorganic or organic electroluminescent light sources), a laser diode light source, a solid state emitter light source (such as a light emitting diode (LED)), a light pipe source, or the like. Light source or light sources 72 may also comprise a non-incandescent light source unit such as described in co-pending provisional application entitled VEHICULAR NON-INCANDESCENT LIGHT SOURCE UNIT, Ser. No. 60/271,466, filed Feb. 26, 2001, by John O. Lindahl and Niall R. Lynam, which is incorporated by reference in its entirety. Alternately or in addition, signal light assembly 66 may include a reflector, which directs light from light source(s) 72 in a desired light pattern.

As noted above, module 62 may be mounted to or formed as part of casing 12, such as by co-injection molding, including two-shot molding. For example, the polymer forming mirror casing 12 may be injected into a first mold cavity of an injection molding machine while the polymers forming covers 70 and 61b are injected into second and third mold cavities corresponding to covers 70 and 61b.

Referring to FIG. 10, the numeral 110 generally designates another embodiment of the exterior sideview mirror assembly of the present invention. Exterior sideview mirror assembly 110 includes a mirror casing 112 and a mounting portion 114, which mounts to a side of a vehicle. In the illustrated embodiment, mirror casing 112 is pivotally mounted to mounting portion 114 and is adapted to pivot about a pivot axis 116, for example by a break-away mechanism, which are commonly known in the art. Reference is made to U.S. Pat. Nos. 6,109,586; 5,903,402; and 5,949,591 and U.S. provisional patent application Ser. No. 60/225,128, now U.S. Pat. No. 6,637,715, which are incorporated in their entireties by reference herein, for examples of suitable break-away mechanisms. Alternately or in addition, mirror casing 112 may incorporate a power-fold mechanism, such as disclosed in U.S. Pat. Nos. 6,243,218; 5,210,651; and 5,579,178, which are incorporated by reference in their entireties herein. Furthermore, assembly 110 may incorporate an actuator that folds mirror casing 112 during operation to reduce wind drag as previously described in reference to the previous embodiment. However, it should be noted that mirror casing 112 may be fixedly mounted to mounting portion 114.

Mirror casing 112 includes a first casing portion 112a, which houses reflective element assembly 118, and a second mirror casing portion 112b, which is pivotally mounted to first casing portion 112a. Reflective element assembly 118 includes a reflective element 120, which is preferably mounted on a backing element as is known in the art, which in turn is optionally mounted to an actuator to provide repositioning of reflective element assembly 118 about one or more axes so that a driver of the vehicle may adjust the orientation of the reflective element assembly. For example of suitable actuators, reference is made to U.S. Pat. Nos. 5,900,999; 5,986,364; 6,094,027; 6,037,689; 6,132,052; 6,168,279; 6,213,612; and 6,243,218, which are incorporated by reference in their entireties herein.

Mirror casing portion 112b is rotatably mounted to mirror casing portion 112a about an axis 122 so that it can be moved between a normal operating position in which mirror casing portion 112b is adjacent mirror casing portion 112a (shown in phantom in FIG. 10) and a folded, extended position in which mirror casing portion 112b is directed downwardly toward the ground surface adjacent the side of the vehicle (as shown in solid in FIG. 10). Mirror casing portion 112b houses a second reflective element assembly 124 which faces rearwardly of the vehicle when mirror casing portion 112b is positioned in its normal operating position to thereby provide additional reflective surface for mirror assembly 110. Preferably, reflective element assembly 124 includes a curved reflector to provide a spotter mirror, which increases the field of view of mirror assembly 110.

In addition, mirror casing portion 112b includes a light assembly 126. In the illustrated embodiment, light assembly 126 is mounted to an end wall 130 of mirror casing portion 112b. In this manner, when casing portion 112b is moved to its folded position, light assembly 126 directs light downwardly from mirror casing 112b and optionally outwardly. Thus, when actuated, light assembly 126 illuminates a ground area adjacent a vehicle. Light assembly 126 is adapted to create a puddle of light, which may extend adjacent a wheel of the vehicle and, therefore, is particularly suitable when changing a tire when the lighting conditions are low. Though illustrated as projecting outwardly from end wall 130, it should be understood, that light assembly 126 may be mounted such that its cover or lens 132 is generally flush with end wall 130 so as to not to protrude into the slip stream of mirror assembly 110. For examples of suitable light assemblies, reference is made to U.S. Pat. Nos. 5,371,657; 5,497,305; 5,497,306; 5,669,699; 5,669,704; 5,879,074; 5,823,654; 5,669,705; 5,863,116; 6,074,777; 6,086,229; 6,149,287; 6,099,155; and application Ser. No. 09/335,010, now U.S. Pat. No. 6,276,821, all of which are incorporated by reference in their entireties herein.

In addition, when mirror casing portion 112b is moved to its folded position, reflective element assembly 124 faces forwardly of the vehicle so that a person changing a tire, for example, at the front end of the vehicle will be able to periodically check to make sure that there is nothing or no one approaching him or her from behind, thereby adding additional safety aspects to mirror assembly 110.

Optionally, reflective element assembly 124 may be mounted by an actuator in mirror casing portion 112b such that the field of view of reflective element assembly 124 may be adjusted remotely. For example, reflective element assembly 124 may be mounted in mirror casing portion 112b by a manual actuator, such as a Boden cable type actuator or an electrical actuator, which are commonly known in the art. In this manner, reflective element assembly 118 and 124 may be independently adjusted when mirror casing portion 112b is in both its normal operating position and its extended position.

Mirror casing 112b may be manually moved between its normal operating position and its folded, extended position. For example, mirror casing portion 112b may be mounted by a break-away mechanism to mirror casing portion 112a such that the folding of mirror casing portion 112b is achieved by applying a pre-selected force to mirror casing portion 112b about axis 122. However, the spring of the break-away mechanism is preferably designed to maintain mirror casing portion 112b and its normal operating position even at speeds exceeding 70 mph or greater and yet sized to permit a person to apply sufficient force to mirror casing portion 112b to move it from its normal operating position to its folded, extended position. Alternately, mirror assembly 110 may include a power-fold mechanism, which moves mirror casing portion 112b between its normal operation position and its folded position.

Referring to FIG. 11, the numeral 210 designates another embodiment of the mirror assembly of the present invention. Exterior rearview mirror assembly 210 includes a mirror casing 212 and a mounting portion 214, which is adapted to mount mirror assembly 210 to a side of the vehicle.

In the illustrated embodiment, mirror casing 212 is rotatably mounted to mirror mounting portion 214 about a pivot axis 216 by a break-away mechanism, which are commonly known in the art. For suitable examples of break-away mechanisms, reference is made to the patents noted above. Mirror casing 212 houses a reflective element assembly 216, which may comprise a fixed reflective element assembly or may comprise an adjustable reflective element assembly that is mounted to an actuator, such as a manual actuator or an electrical actuator, which are commonly known in the art. Mirror casing 212 includes a mounting surface 220, which defines a storage space for holding and stowing a light assembly 222. In the illustrated embodiment, mounting surface 220 is provided at a rear facing wall 224 of mirror casing 212 and, further, at an outboard end of mirror casing 212 such that light assembly 222 is positioned behind reflective element assembly 216.

As best seen in FIG. 11, when positioned and mounted to mounting surface 220, the outer surface of housing 226 of light assembly 222 at least generally follows the contours of mirror casing 212 such that when light assembly 222 is in its stowed position, light assembly 222 forms a unitary part of mirror assembly and is generally inconspicuous.

Referring to FIG. 12, light assembly 222 includes a light source 228 and a cover or lens 230, which when mounted on housing 226 generally follows the profile of mounting surface 220 such that, as noted previously, light assembly 222 generally follows the contours of mirror casing 212 when in its stowed position. In addition, light assembly 222 includes a cord 232, which supplies power to light source 228. Cord 232 is coupled to a power source, such as the vehicle ignition voltage, either directly or through a vehicle area network through mirror assembly 210, such as described in U.S. Pat. No. 5,798,575, which is incorporated by reference in its entirety. Cord 232 preferably comprises a retractable cord, which extends into and winds around a retracting reel 234, which is housed in casing 212. In this manner, when a person desires to use light assembly 222 independently of mirror assembly 210, light assembly 222 may be extended away from mirror assembly 210 for use, for example, in lighting the trunk of the vehicle, rear or forward tires of the vehicle, or may be used for security purposes. It should be understood that light assembly 222 may include a battery including a rechargeable battery, with cord providing a tether function only. In which case, light assembly 222 may include exteriorly positioned contacts which may contact with a corresponding set of contacts provided on casing 212, which in turn are coupled to a power supply, such as the vehicle ignition voltage, so that the battery can be recharged when it is moved to its stowed position.

Light assembly 222 is mounted to casing 212 by one or more mounting members, which are formed either on housing 226 or mirror casing 212 and which engage corresponding receiving structures or the like on either mirror casing 212 or housing 226. For example, casing 212 may incorporate bayonet type couplers, which extend into openings provided in housing 226 and are engaged therein by receiving structures formed on housing 226. Similarly, housing 226 may incorporate bayonet type couplers which extend into and are engaged by corresponding structures on casing 212 which are positioned at or on mounting surface 220. In this manner, light assembly 222 is rigidly mounted to mirror casing 212 but is manually retrievable therefrom for use independently of mirror assembly 210. Optionally, housing 226 may incorporate one or more gripping surfaces to ease removal of light assembly 222 from mirror assembly 210.

Referring to FIG. 13, the numeral 310 generally designates another embodiment of a mirror assembly of the present invention. Mirror assembly 310 includes a mirror casing 312 and a mounting portion 314, which is adapted to mount mirror casing 312 to a side of a vehicle. Housed in casing 312 is a reflective element assembly 316. Reflective element assembly 316 may be supported in a fixed position or may be mounted on an actuator to provide adjustment for reflective element assembly 316 about one or more axes.

In the illustrated embodiment, mirror assembly 310 includes a light assembly 322 which is removably mounted to casing 312 and which may be removed for use independent of mirror assembly 310. Similar to the previous embodiments, light assembly 322 is mounted to mirror casing on a mounting surface 320, which is provided at an outboard lower end of casing 312. In addition, light assembly 322 includes a housing 326 whose outer surface generally follows the contour of mirror casing 312 when light assembly 322 is mounted to mounting surface 320 and in its stowed position. Also similar to the previous embodiment, light assembly 322 includes a retractable cord 332 which tethers light assembly 322 to mirror casing 310 and also optionally provides a power supply to the light source positioned in light assembly 322.

Light assembly 322 is mounted to casing 312 by one or more releasable couplers, such as bayonet type couplers, snap fit couplers, or the like. In this manner, light assembly 322 will remain rigidly mounted to mirror casing 312 when mounted in its stowed position but may be detached manually by a person so that light assembly 322 may be used independently of mirror assembly 310.

Referring to FIGS. 14 and 15, mirror assembly 310' includes a casing 312' and a mounting portion 314', which is adapted to mount mirror casing to a side of a vehicle similar to the previous embodiment. Casing 312' houses a reflective element assembly 316', which may comprise a fixed positioned reflective element assembly or an adjustable reflective element assembly, as described in reference to the previous embodiment. In the illustrated embodiment, mirror assembly 310' includes a light assembly module 322' which is rotatably mounted to mirror casing 312' about a pivot axis 322a' such that light assembly 322' may be moved from a normal operating position in which light assembly 322' generally follows the contour of mirror casing 312' (and appears to form a unitary part of mirror casing 312') and an extended position in which light assembly 322' is folded or rotated outwardly from mirror casing 312' to provide a source of light.

As best understood from FIG. 14, light assembly 322' includes a housing 326', a light source or sources 328', and a cover or lens 330'. Housing 326' is rotatably mounted to mirror assembly 310' on a shaft or bushing that extends between housing 322' and casing 312'. Preferably, light assembly 322' is pivotally mounted to mirror casing 312' by a break-away mechanism, which retains light assembly 322' in its stowed position until a pre-selected force is applied to housing 326' in either a forward or rearward direction to rotate mirror assembly 322' either in a clockwise or counterclockwise direction as viewed from FIG. 14.

Lens or cover 330' is provided along edge 326a' of housing 326a such that when light assembly 322' is returned to its stowed position, lens 330' faces upwardly and aligns with lower end wall 312a' of mirror casing 312'. In this manner, when light assembly 322' is moved to its stowed position, light source 328' and cover 330' are inconspicuous and not readily observable. On the other hand, when light assembly 322' is rotated about axis 322a', cover 330' faces outwardly so that the light from light source 328' may be used to illuminate an area adjacent the vehicle. For example, when housing 326' is rotated 180° from its stowed position (such as shown in FIG. 15), light from light source 328' will project through cover 330' and be directed, for example, downwardly toward the ground adjacent the vehicle. Depending on the optics of cover 330', directionality of light source(s) 328', or optional reflectors, which may be incorporated into housing 826', the direction of the light may be varied. In the illustrated embodiment, cover 330' extends along edge 326a' from an outboard end of housing 326' to an inboard end of housing 326' with a portion of cover 330' facing inwardly toward the vehicle. In this manner, light assembly 322' may also direct light to the side or door of the vehicle.

Alternately, cover 330' may comprise a light pipe, which is adapted to direct the light from light source(s) 328' in a desired light pattern.

It should be understood that housing 326' may be pivoted to other angular orientations to thereby direct the light, for example, to the rear of the vehicle or to the front of the vehicle, for example, toward a front wheel of the vehicle.

Light assembly 222', 322, and 322' are particularly suitable for illuminated areas exteriorly of the vehicle to provide a lighted security zone. Light assemblies 222 and 322 may be extended from exterior rearview mirror assembly 310 to provide light at a location remote from mirror assembly 310, while light assembly 322' is suitable for lighting an area generally and immediately adjacent the side of the vehicle, including the area adjacent the door of the vehicle or both forward and rearward wheels on the side of the vehicle to which the mirror assembly is mounted.

Figure 16:
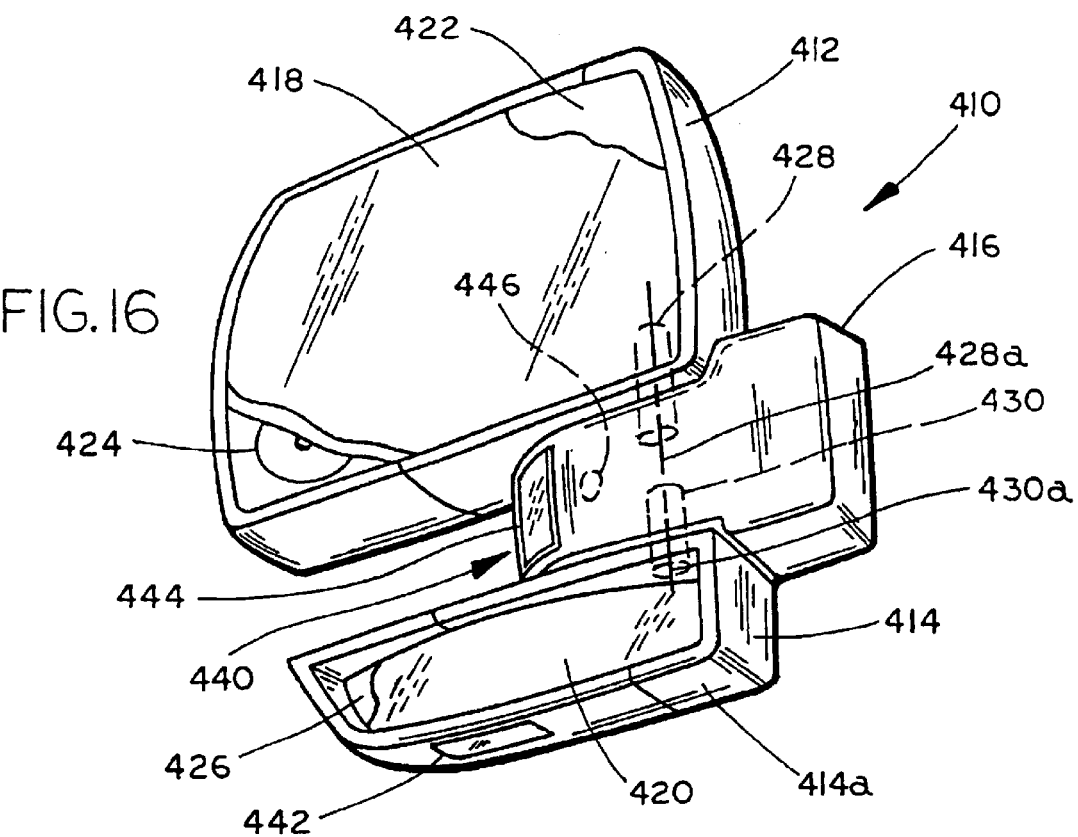
FIG. 16 is a forward perspective view of another embodiment of an exterior mirror assembly of the present invention.
Figure 17:
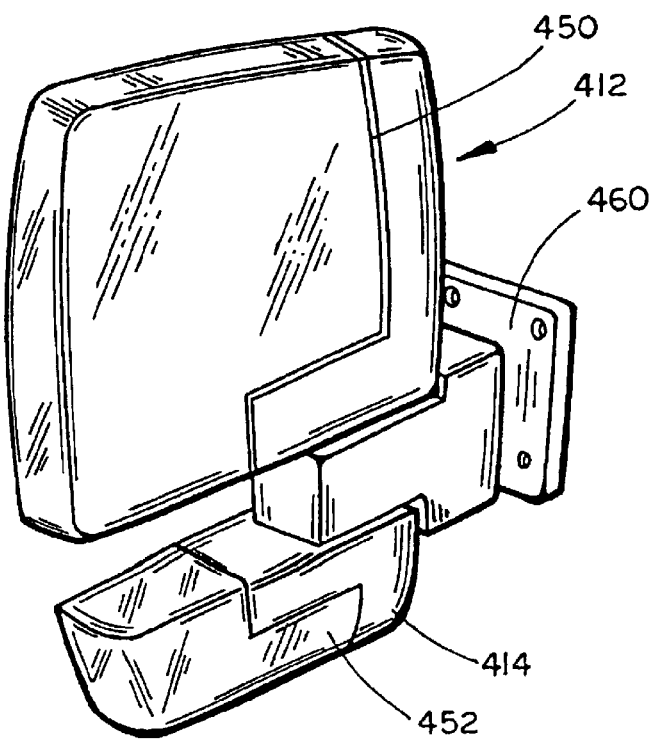
FIG. 17 is a rearward perspective view of the mirror assembly of FIG. 16.

Referring to FIGS. 16 and 17, the numeral 410 generally designates another embodiment of an exterior rearview mirror assembly. Exterior rearview mirror assembly 410 includes an upper mirror casing 412 and a lower mirror casing 414, which are commonly mounted to a support 416, which is adapted to mount to a side of a vehicle. Support 416 may be rigidly mounted to the side of the vehicle or may be mounted by a break-away and/or power-fold mechanism, as is commonly known in the art. Upper casing 412 and lower casing 414 each house a reflective element 418 and 420, respectively. Upper reflective element 418 preferably comprises a planar reflective element having a generally unit magnification, which is mounted on a backing plate or member 422, which is either fixedly mounted in casing 412 or mounted on an actuator 424 which provides for adjustment of reflective element 418 about one or more axes. For examples of suitable actuators, reference is made to the previous embodiments.

Reflective element 420 optionally comprises a curved reflective element, including an aspheric or multi-radiused reflective element, to provide a wide-angle view of "spotter" mirror. Reflective element 420 may be similarly mounted on a backing plate 426 which in turn may be similarly mounted on an actuator to provide adjustment of the orientation of reflective element 420 about one or more axes. Upper casing 412 is optionally pivotally mounted on a bushing 428 on support 416 and may include a break-away mechanism or power-fold mechanism to permit mirror casing 412 to pivot about pivot axis 428a of bushing 428. Mirror casing 414 may be similarly pivotally mounted to support 416 on a bushing 430 so that mirror casing 414 may pivot about pivot axis 430a independently of mirror casing 412. Similarly, mirror casing 414 may be pivoted about bushing 430 by a power-fold mechanism and/or a break-away mechanism. Bushings 428 and 430 may comprise a single bushing in which case mirror casing 412 and mirror casing 414 may be pivoted about a common axis pivot axis either in unison or independently with each mirror casing having its own actuator. In addition, mirror casings 412 and 414 may be pivoted about their respective pivot axes by an actuator, such as a power-fold mechanism, to fold each or both mirror casings closer toward the vehicle to reduce the drag of the mirror casings, as described in co-pending application entitled VEHICLE EXTERIOR REARVIEW MIRROR ASSEMBLY, Ser. No. 60/301,219, filed Jun. 27, 2001, by Leo Paveo, which is incorporated by reference in its entirety herein.

Similar to the previous embodiments, mirror assembly 410 incorporates one or more light assemblies 440 and 442. Light assembly 440 is mounted in support 416 and may be used as a turn signal light, such as described in reference to the previous embodiments. In the illustrated embodiment, light assembly 440 is positioned at an outboard end of support 416 and includes a cover or lens 444 which directs light from a light source or light sources 446 outwardly and generally rearwardly of the vehicle when mirror assembly 410 is mounted to a side of the vehicle. For examples of suitable light sources, reference is made to the previous embodiments. Depending on the directionality of light source or light sources 446, cover 444 may incorporate light directing structures and may comprise, for example, an optic lens, such as a segmented lens, a prismatic lens, or a Fresnel lens. Alternately or in addition, light assembly 440 may incorporate a reflector, which directs light from light source or sources 446 outwardly and generally rearwardly of the vehicle. Furthermore, light assembly 440 may comprise a modular light assembly, such as disclosed in U.S. Pat. Nos. 5,371,659; 5,497,305; 5,669,705; 5,863,116; 6,074,777; 6,099,155; 5,497,306; 5,669,699; 5,669,704; 5,879,074; 5,823,654; 6,086,229; 6,149,287; and U.S. patent application Ser. No. 09/596,015, now U.S. Pat. No. 6,296,379; Ser. No. 09/641,371, now U.S. Pat. No. 6,299,333; Ser. No. 09/335,010, now U.S. Pat. No. 6,276,821; and Ser. No. 09/630,332, now U.S. Pat. No. 6,280,069, all of which are incorporated by reference in their entireties herein. In this manner, regardless of the orientation of mirror casing 412 and mirror casing 414, light assembly 440 may direct light outwardly and generally rearwardly of the vehicle in a fixed pattern relative to the side of the vehicle. Furthermore, by positioning light assembly 440 at the outboard end of support 416, the light pattern is generally unobservable by a driver of the vehicle. The color of the light pattern may be introduced by cover 444 and/or a filter and/or light sources 446.

Light assembly 442 is provided in casing 414 and is positioned in a lower casing wall 414a. Light assembly 442 is particularly suitable for ground illumination adjacent the side of the vehicle in which mirror assembly 410 is mounted. For examples of suitable light assemblies, reference is made herein to U.S. Pat. Nos. 5,371,659; 5,497,305; 5,669,705; 5,863,116; 6,074,777; 6,099,155; 5,497,306; 5,669,699; 5,669,704; 5,879,074; 5,823,654; 6,086,229; 6,149,287; and U.S. patent application Ser. No. 09/596,015, now U.S. Pat. No. 6,296,379; Ser. No. 09/641,371, now U.S. Pat. No. 6,299,333; Ser. No. 09/335,010, now U.S. Pat. No. 6,276,821; and Ser. No. 09/630,332, now U.S. Pat. No. 6,280,069, all of which are incorporated by reference in their entireties herein.

Referring to FIG. 17, mirror casings 412 and 414 may incorporate a skull cap 450, 452, respectively, to provide styling to mirror assembly 410. Alternately, mirror casings 412 and 414 may be coated or painted or provided with an in-mold film, such as described in U.S. patent applications entitled COATED EXTERIOR MIRROR HOUSING FOR VEHICLES, Ser. No. 09/348,083, filed Jul. 6, 1999; now U.S. Pat. No. 6,150,014; and COATED POLYOLEFIN EXTERIOR VEHICLE PARTS AND METHOD FOR MAKING SAME, Ser. No. 09/489,322, filed Jan. 21, 2000, which are herein incorporated by reference in their entireties. In addition, mirror casings 412 and 414 may be provided with a film which forms a two-tone effect, such as described in co-pending application entitled VEHICLE EXTERIOR REARVIEW MIRROR ASSEMBLY, filed Jun. 27, 2001, by Leo Pavao, which is incorporated by reference in its entirety herein.

As noted above, support 416 is adapted to mount mirror assembly 410 to a side of a vehicle. As best seen in FIG. 17, support 416 mounts to or is formed as part of a mounting portion 460, which mounts to a side of the vehicle by a plurality of fasteners (not shown). Optionally, support 416 may be pivotally mounted to mounting portion 416 on a bushing so that mirror casings 412 and 414 pivot about mounting portion 416, for example by a break-away mechanism or a power-fold mechanism. In addition, support arm 416 may pivot about mounting portion 416 to adjust the orientation of mirror casings 412 and 414 generally simultaneously to reduce the wind drag of mirror assembly 410, such as described in reference to co-pending application entitled VEHICLE EXTERIOR REARVIEW MIRROR ASSEMBLY, Ser. No. 60/301,219, filed Jun. 27, 2001, by Leo Pavao, which is incorporated by reference in its entirety herein.

From the foregoing description, it can be appreciated that mirror casings 412, 414 can be independently moved or moved in unison about support 416 to adjust the orientation of the reflective element housed in their respective mirror casing and, further, that one or more reflective elements 418, 420 may be independently adjusted to suit the needs of the driver. Furthermore, light assembly 440 may provide a signal light assembly or may provide a spot light assembly, similar to the spot light assembly described in reference to co-pending application entitled VEHICLE EXTERIOR REARVIEW MIRROR ASSEMBLY, Ser. No. 60/301,219, filed Jun. 27, 2001, by Leo Paveo, which is incorporated by reference in its entirety herein.

As would be understood by those skilled in the art, modifications can be made to the various components of the several embodiments described above without departure from the spirit of the present invention. For example, mirror assembly 10 may house a plurality of electrical or electronic devices, such as antennas, including global positioning system (GPS) or cellular phone antennas, such as disclosed in U.S. Pat. No. 5,971,552, a communication module, such as disclosed in U.S. Pat. No. 5,798,688, displays such as shown in U.S. Pat. No. 5,530,240 or in U.S. application Ser. No. 09/244,726, filed Feb. 5, 1999, now U.S. Pat. No. 6,172,613, and application entitled SIDEVIEW MIRROR ASSEMBLY WITH ADDED FEATURE MODULAR DISPLAY, filed Nov. 24, 1999, by Timothy Skiver et al., now U.S. Pat. No. 6,329,925, blind spot detection systems, such as disclosed in U.S. Pat. Nos. 5,929,786 or 5,786,772, transmitters and/or receivers, such as garage door openers, a digital network, such as described in U.S. Pat. No. 5,798,575, a high/low head lamp controller, such as disclosed in U.S. Pat. No. 5,715,093, a memory mirror system, such as disclosed in U.S. Pat. No. 5,796,176, with all of the referenced patents and applications commonly assigned to Donnelly Corporation, the disclosures of which are herein incorporated by reference in their entireties.

Changes and modifications in the specifically described embodiments can be carried out without departing from the principles of the invention, which is intended to be limited only by the scope of the appended claims, as interpreted according to the principles of patent law.

We claim:

1. An exterior sideview mirror assembly for a vehicle, said mirror assembly comprising:

a fixed portion adapted to mount to a vehicle;

a movable portion movably mounted to said fixed portion;

a reflective element positioned in said movable portion;

said mirror assembly including a closed storage compartment; and a light assembly positionable in and adapted to be supported in said compartment and generally hidden from view when stored in said closed storage compartment, said light assembly including a power supply and being removable from said compartment and being adapted to be operable independent of said mirror assembly when removed from said storage compartment to provide a light source at a location remote from said mirror assembly.

2. The exterior sideview mirror assembly according to claim 1, wherein said compartment is defined by a recessed portion of said movable portion.

3. The exterior sideview mirror assembly according to claim 2, wherein said recessed portion is positioned below said reflective element.

4. The exterior sideview mirror assembly according to claim 3, wherein said movable portion includes a cover, said cover closing said recessed portion to provide said closed compartment.

5. An exterior sideview mirror assembly for a vehicle, said mirror assembly comprising:

a fixed portion adapted to mount to a vehicle;

a movable portion movably mounted to said fixed portion;

a reflective clement positioned in said movable portion;

said mirror assembly including a storage compartment, said compartment being defined by a recessed portion of said movable portion;

a light assembly positionable in and adapted to be supported in said compartment, said light assembly being removable from said compartment and being adapted to be useable when removed from said storage compartment; and a second recessed portion, said second recessed portion housing an accessory which is accessible exteriorly of the vehicle.

6. The exterior sideview mirror assembly according to claim 5, wherein said accessory comprises a power socket.

7. The exterior sideview mirror assembly according to claim 1, wherein said mirror assembly includes a pair of contacts for coupling to a rechargeable battery positionable in said light assembly, said rechargeable battery comprising said power supply.

8. The exterior sideview mirror assembly according to claim 1, wherein said movable portion includes a bottom wall, said compartment provided at said bottom wall.

9. The exterior sideview mirror assembly according to claim 1, wherein said movable portion includes a mirror casing and a modular housing, said modular housing including said compartment.

10. The exterior sideview mirror assembly according to claim 1, wherein said movable portion includes a second reflective element.

11. The exterior sideview mirror assembly according to claim 10, wherein said second reflective element comprises a curved reflective element.

12. An exterior sideview mirror assembly for a vehicle, said mirror assembly comprising:

a fixed portion adapted to mount to a vehicle;

a movable portion movably mounted to said fixed portion;

a reflective element positioned in said movable portion;

said mirror assembly including a storage compartment; and a light assembly position in and adapted to be supported in said compartment, said light assembly being removable from said compartment and being adapted to be useable when removed from said storage compartment, said light assembly including a pair of contacts for coupling to a rechargeable battery positionable in said light assembly, said compartment including a pair of contacts for connecting to a power source, said pair of contacts of said compartment positioned to align with and make contact with said contacts of said light assembly for recharging a rechargeable battery contained in said light assembly when said light assembly is positioned in said compartment.

13. The exterior sideview mirror assembly according to claim 12, wherein said movable portion includes a bottom wall, said compartment provided at said bottom wall.

14. The exterior sideview mirror assembly according to claim 12, wherein said movable portion includes a mirror casing and a modular housing, said modular housing including said compartment.

15. The exterior sideview mirror assembly according to claim 12, wherein said movable portion include a second reflective element.

16. The exterior sideview mirror assembly according to claim 12, wherein said second reflective element comprises a curved reflective element.

17. An exterior sideview mirror assembly for a vehicle, said mirror assembly comprising:
a fixed portion adapted to mount to a vehicle;
a movable portion movably mounted to said fixed portion, said movable portion including a mirror casing and a modular housing;
a reflective element positioned in said movable portion;
said mirror assembly including a storage compartment, wherein said modular housing includes said compartment;
a light assembly positionable in and adapted to be supported in said compartment, said light assembly being removable from said compartment and being adapted to be useable when removed from said storage compartment; and
wherein said movable portion includes a second compartment.

18. The exterior sideview mirror assembly according to claim 17, wherein said second compartment is provided in said modular housing.

19. The exterior sideview mirror assembly according to claim 18, wherein said second compartment houses a power supply plug whereby said power supply plug is accessible exteriorly of the vehicle.

20. The exterior sideview mirror assembly according to claim 19, wherein said power supply plug is adapted for coupling to a vehicle ignition voltage.

21. An exterior sideview mirror assembly for a vehicle, said mirror assembly comprising:
a casing having a reflective element;
a light assembly having a housing, a light source positioned in said housing, and a cord, said cord coupling said light assembly to said mirror assembly; and
said casing including a casing wall, said casing wall having a recess formed therein, said recess defining a storage space for storing said light assembly wherein said light assembly is positionable in said recess for storage, said light assembly being removable and extendible from said recess and being adapted for use as a flashlight exteriorly of said storage space to provide a light assembly at a location remote from said casing, and said light assembly being adapted to include a power source whereby said light assembly can be used independently of said casing.

22. The exterior sideview mirror assembly according to claim 21, wherein said light assembly is coupled to said casing by said cord.

23. The exterior sideview mirror assembly according to claim 21, wherein said cord comprises a power cord, said power cord for electrically coupling said light assembly to a vehicle based power source.

24. The exterior sideview mirror assembly according to claim 21, wherein said cord comprises a retractable cord.

25. The exterior sideview mirror assembly according to claim 21, wherein said casing wall includes an outboard end, said outboard end including said recess.

26. The exterior sideview mirror assembly according to claim 25, wherein said outboard end includes an upper portion, said upper portion including said recess.

27. The exterior sideview mirror assembly according to claim 26, wherein said recess includes a profile, said light assembly including a corresponding profile whereby said light assembly forms a unitary part of said mirror assembly when said light assembly is positioned and mounted in said recess.

28. The exterior sideview mirror assembly according to claim 25, wherein said outboard end includes a lower portion, said lower portion including said recess.

29. The exterior sideview mirror assembly according to claim 28, wherein said light assembly is rotatably mounted to said casing.

30. The exterior sideview mirror assembly according to claim 29, wherein said light assembly includes a rotatable connection with said casing, said mirror assembly further comprising a break-away mechanism at said connection whereby said light assembly may be manually rotated.

31. An exterior sideview mirror assembly for a vehicle, said mirror assembly comprising:
a first mirror casing having a first reflective element;
a second mirror easing having a second reflective element, one of said reflective elements comprising a curved reflective element, and said first mirror casing being movable about a first pivot axis, and said second mirror casing being movable about a second pivot axis whereby said second mirror casing may be rotated about said second pivot axis independent from said first mirror casing and said first mirror casing may be rotated about said first pivot axis independent of said second mirror casing for repositioning said reflective elements independently, said second pivot axis comprising a generally vertical pivot axis, and said second mirror casing including a light assembly, said light assembly adapted to direct light from said mirror assembly.

32. The exterior sideview mirror assembly according to claim 31, wherein said first pivot axis and said second pivot axis are co-linear.

33. The exterior sideview mirror assembly according to claim 31, further comprising a support adapted to mount said first and second mirror casings to a vehicle.

34. The exterior sideview mirror assembly according to claim 33, wherein said first and second mirror casings are rotatably mounted to said support.

35. The exterior sideview mirror assembly according to claim 34, wherein said pivot axes of said first and second mirror casings are co-liner.

36. The exterior sideview mirror assembly according to claim 31 wherein said light assembly is positioned at a wall of said second mirror casing wherein said light assembly directs light generally downwardly.

37. An exterior sideview mirror assembly for a vehicle, said mirror assembly comprising:
a first mirror casing having a first reflective clement; and
a second mirror casing having a second reflective element, one of said reflective elements comprising a curved reflective element, and said first mirror casing being movable about a first pivot axis, and said second mirror casing being movable about a second pivot axis whereby said second mirror casing may be rotated relative to said first mirror casing for repositioning said second reflective element relative to said first reflective element, said second pivot axis comprising a generally horizontal pivot axis, said second mirror casing including a light assembly to direct light from said mirror assembly, said light assembly being positioned at an end wall of said second mirror casing wherein said light assembly directs light generally downwardly when said second minor casing is rotated in air extended position, and wherein said second mirror casing is rotatable approximately 180° about said generally horizontal pivot axis wherein said second reflective element is moved between a rearward facing orientation to a forward facing orientation.

38. The exterior sideview mirror assembly according to claim 37, wherein said second mirror casing is pivotally mounted to said first mirror casing at a lower end of said first mirror casing.

39. The exterior sideview mirror assembly according to claim 37, wherein said first mirror casing includes a recessed portion, said second mirror casing pivoting into said recessed portion when said second mirror casing is pivoted to said rearward facing orientation.

40. The exterior sideview mirror assembly according to claim 39, wherein said first and second mirror casings together form a generally rectangular perimeter when said second mirror casing is pivoted into said recessed portion.

* * * * *

UNITED STATES PATENT AND TRADEMARK OFFICE
CERTIFICATE OF CORRECTION

PATENT NO. : 6,811,288 B2 Page 1 of 1
APPLICATION NO. : 10/184830
DATED : November 2, 2004
INVENTOR(S) : Barry W. Hutzel It is certified that error appears in the above-identified patent and that said Letters Patent is hereby corrected as shown below:

Page 1, In the Title:
"FEATURES" should be "FUNCTIONS".

Column 14:
Line 58, ";" should be --,-- after "1999".

Column 15:
Line 28, "60,301,219" should be --60/301,219--.

Column 16:
Line 24, Claim 5, "clement" should be --element--.
Line 62, Claim 12, "position" should be --positionable--.

Column 18:
Line 33, Claim 31, "easing" should be --casing--.
Line 59, Claim 35, "co-liner" should be --co-linear--.
Line 66, Claim 37, "clement" should be --element--.

Column 19:
Line 37, Claim 37, "minor" should be --mirror--.
Line 13, Claim 37, "air" should be --an--.

Signed and Sealed this

Twenty-ninth Day of August, 2006

JON W. DUDAS
*Director of the United States Patent and Trademark Office*